Jan. 29, 1929.
L. W. CHASE ET AL
1,700,728
CULTIVATOR
Filed Dec. 18, 1926   3 Sheets-Sheet 1
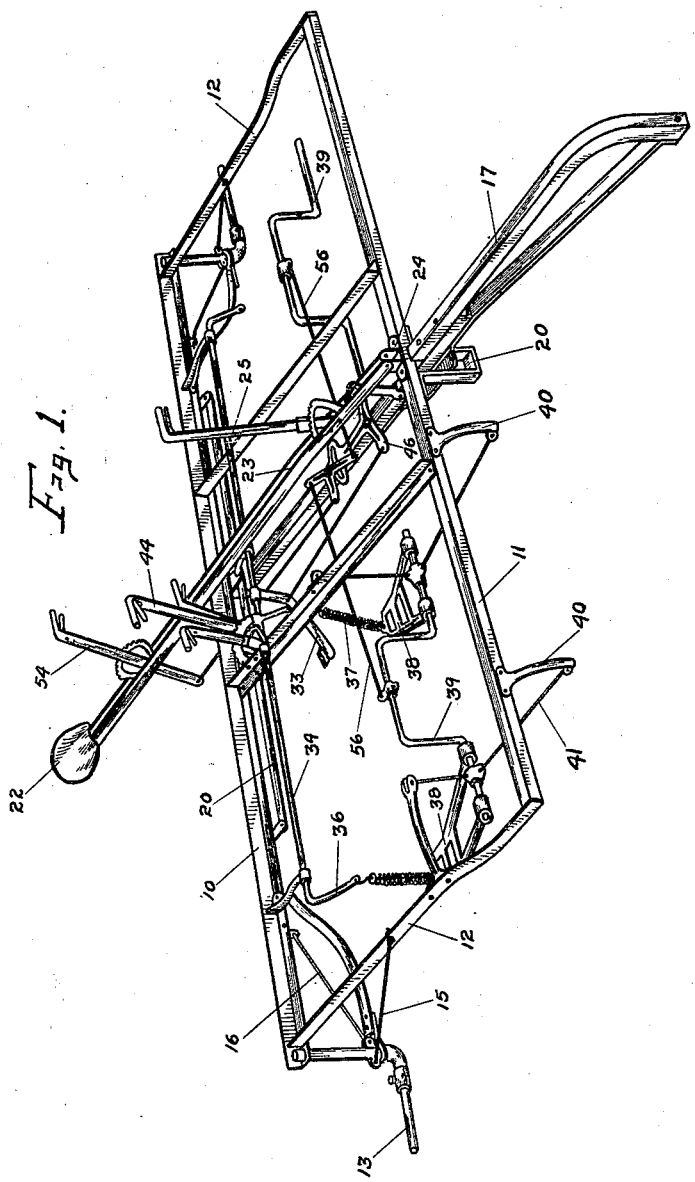
Inventors
L. W. CHASE
J. C. BRAND
By Emil F. Lange
Attorney

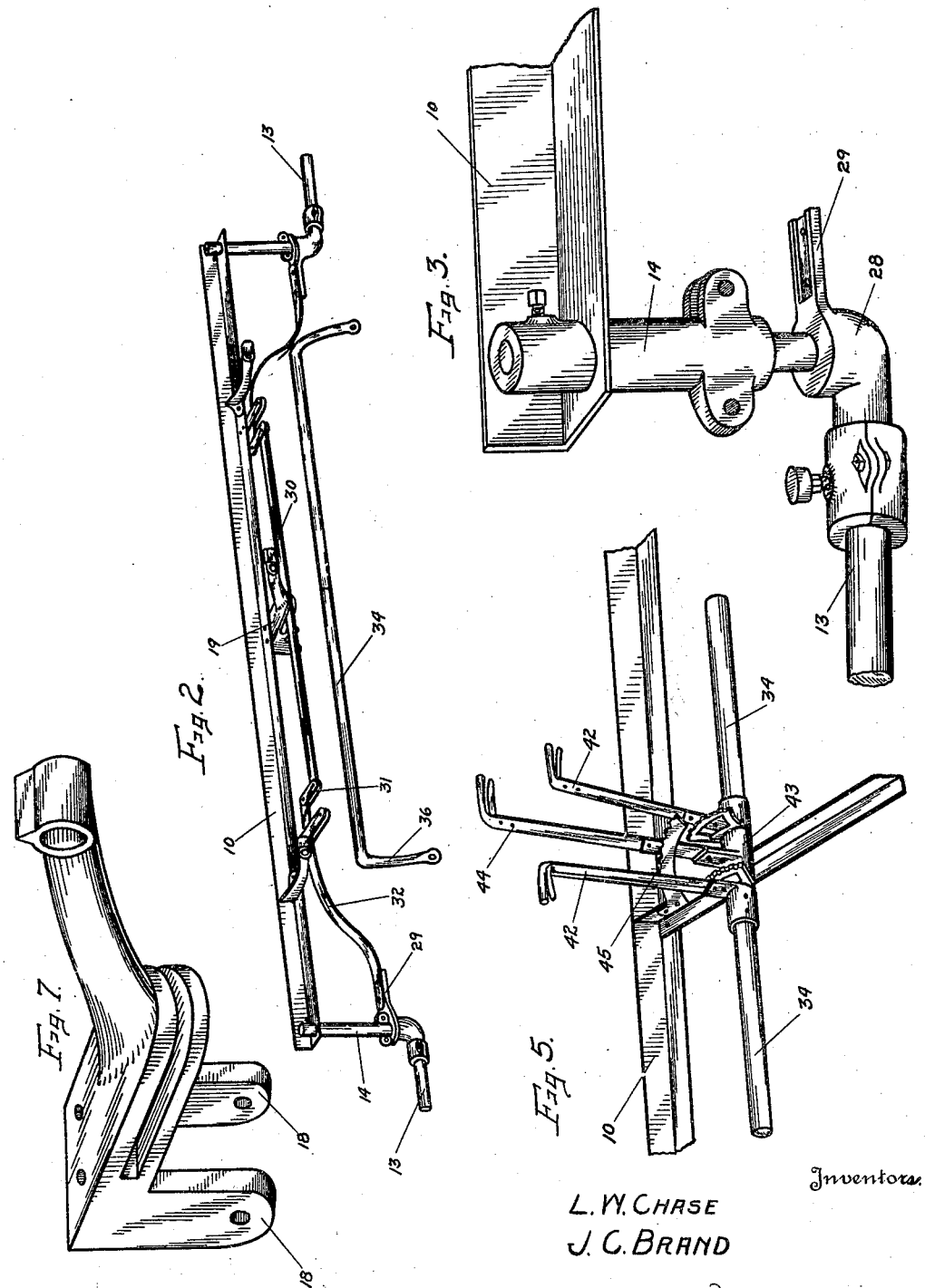

Jan. 29, 1929.
L. W. CHASE ET AL
1,700,728
CULTIVATOR
Filed Dec. 18, 1926  3 Sheets-Sheet 3
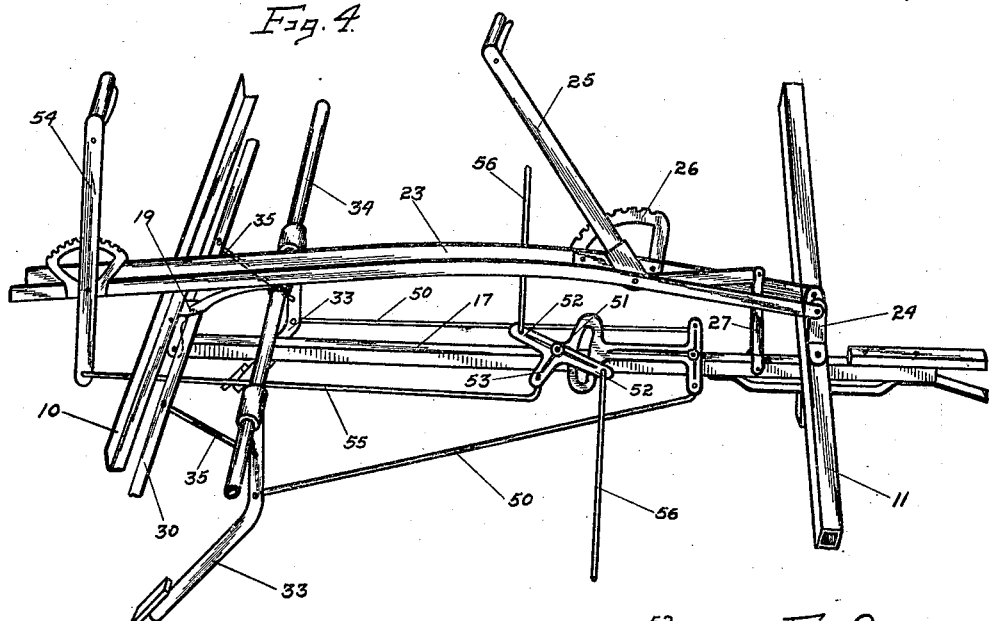
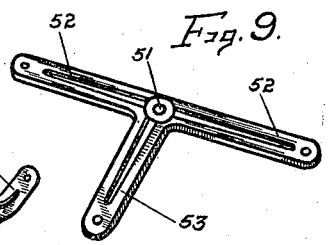
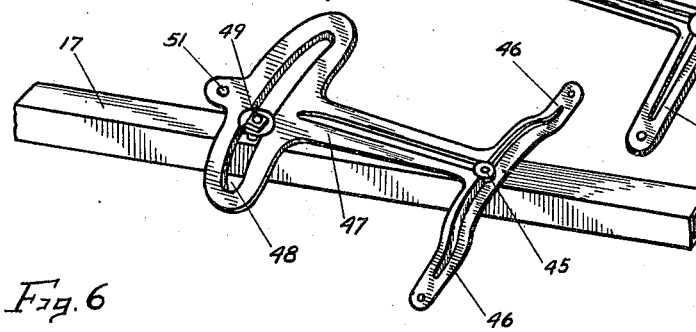
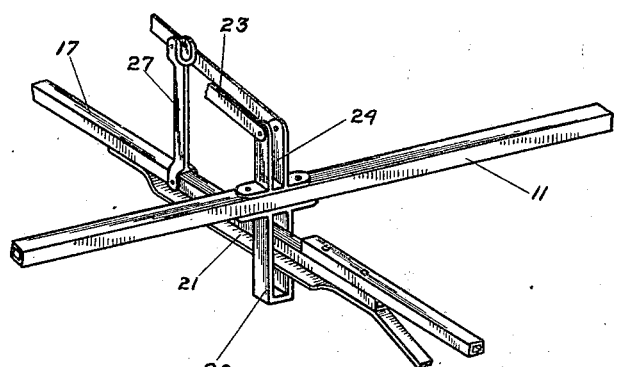
Inventors
L. W. CHASE.
J. C. BRAND.
By Emil F. Lange
Attorney Patented Jan. 29, 1929.

1,700,728

UNITED STATES PATENT OFFICE.

LEON W. CHASE AND JAMES C. BRAND, OF LINCOLN, NEBRASKA, ASSIGNORS TO CHASE PLOW COMPANY, A CORPORATION OF NEBRASKA.

CULTIVATOR.

Application filed December 18, 1926. Serial No. 155,758.

Our invention relates to cultivators and one of its main objects is the provision of a light weight cultivating implement having great flexibility of control, the implement being manually steerable and the cultivating tools being manually shiftable transversely to the implement frame, the implement being provided with mechanism whereby the shifting of the tools may be either independent of or dependent on the steering of the implement. A second object of our invention is the provision of a front truck on which the front portion of the implement frame may be vertically adjusted about a pivotal connection instead of the older and more common sliding connection between a truck standard and the implement frame. Other objects will be pointed out in the following description.

Referring now to the drawings,

Figure 1 is a view in perspective of the cultivator frame and showing particularly the mechanisms which enter into the various adjustments of the cultivator tools.

Figure 2 is a perspective view of the rear bar of the cultivator frame and showing the linkage whereby both rear supporting wheels are moved in unison for steering the cultivator.

Figure 3 is an enlarged view in perspective showing the connection between one of the rear axles and the rear beam of the cultivator frame.

Figure 4 is a perspective view showing the hand and foot operated mechanism for shifting the cultivator gangs laterally and for steering the rear wheels. This figure also shows the hand operated lever and connections for adjusting the front truck of the cultivator.

Figure 5 is an illustration of the lever arrangement for raising and lowering the cultivator gangs.

Figure 6 is a view in perspective of a portion of the front beam of the cultivator and showing its relation with the truck beam.

Figure 7 is an illustration showing the casting to which the truck beam and the steering beam are pivotally connected.

Figure 8 shows the T-shaped lever which is operable by the foot levers to shift the cultivator gangs laterally.

Figure 9 is an illustration of the T-shaped lever which is used for manually shifting the cultivator gangs laterally.

As shown in Figure 1, the cultivator frame consists of a rear beam 10 and a front beam 11 connected at their ends by the straps 12, the beam 10 being preferably formed from angle steel and the beam 11 being rectangular in cross section and preferably hollow. The beams 10, 11 and 12 form a rectangular frame which is made rigid by angle steel braces connecting the beams 10 and 11, the braces also serving as supports for the cultivator gangs. Secured to the rear beam 10 at its extremities are two axles 13 which are pivotally movable about vertical axes. As shown in Figure 3 the axles 13 may be either L-shaped or they may consist of two portions which are secured at right angles to each other, the vertical portion passing through the angle iron beam 10 and in pivotal relation herewith. To prevent vertical movement either upward or downward, two collars are secured about the vertical portion of the axis, the one above and the other below the angle iron. The collar 14 below the angle iron is provided with radial ears as shown in Figure 3 for receiving the braces 15 and 16 shown in Figure 1, these braces being designed for holding the axles 13 in rigid relation with respect to the cultivator frame. The cultivator is, of course, supported at its rear on wheels which are journalled on the axles 13. The support for the front portion of the frame comprises a truck which is secured to the truck beam 17 shown in Figures 1 and 6. This truck beam is preferably formed from a pair of hollow rectangular bars which are joined together as shown in Figure 6, the front bar being forward of the beam 11 and at a higher elevation than the rear portion of the truck beam. The truck beam is pivotally connected at its rear extremity to the downwardly projecting ears 18 of the casting 19 as shown in Figures 4 and 7. A yoke 20 is secured to the beam 11 to serve as a guide for the truck beam 17 when adjusting the beam. The beam is also provided with a bowed strap 21 which may abut against the lower wall of the yoke 20. The seat 22 is secured to the rear end of a seat beam 23, the seat beam being pivotally secured at its forward extremity to a casting 24 projecting upwardly from the beam 11.

The lever 25 with its arcuate rack 26 is secured to the seat beam 23. The lever is hand operated and is provided with a for- wardly extending angular portion, the forward extremity being connected with the truck beam 17 through a link 27. It will thus be seen that the movement of the lever 25 in one direction or the other will raise or lower the front portion of the cultivator frame. The construction described provides for such an adjustment without the necessity of using the older form of front truck adjustment in which the truck is provided with a vertical standard which is slidable in a fixed collar on the implement frame.

The mechanism for steering the rear wheels is best shown in Figure 2. The collar 28 on the axle 13 is provided with an inwardly projecting ear 29. The casting 19 is provided with a pair of forwardly projecting ears to which is pivoted a lever 30. At each end of the lever 30 are links 31, these being connected to arms 32 secured to and projecting from the arms 29. It is obvious that when either of the axles is moved about its vertical pivot the movement will be communicated through the lever 30 to the other axle 13 so that the two wheels always lie in parallel planes. These wheels are manually steerable by means of foot levers 33 which are secured to a shaft 34 forward of the rear beam 10. The shaft 34 comprises two parts as shown in Figure 2, each of the parts having a foot lever 33 pivotally secured thereto. The foot levers 33 are each connected to the steering lever 30 by means of links 35, the two links being on opposite sides of the middle point of the lever 30. The actuation of the foot lever 33 will cause the steering lever 30 to rock about its axis and will cause the rear supporting wheels to move about their vertical axes.

The cultivator gangs and the mechanism for raising and lowering the gangs are all of more or less common construction and for this reason they will not be described in detail. As shown, the shaft 34 is provided with forwardly and downwardly projecting arms 36, and links 37 connect these arms with the cultivator supports 38. The cultivator supports 38 are pivotally secured to the member 39 which is U-shaped at its middle portion and which has laterally extending horizontal arms for pivotally receiving the cultivator supports. The member 39 is also connected to an arm 40 secured to the beam 11, the link 41 connecting the member 39 to the arm 40 in such a manner that the member 39 may be raised or lowered or moved in either direction of its length. The cultivator includes two gangs of cultivating tools, each gang being mounted on the member 39. The mechanism for raising and lowering the cultivator gangs is best shown in Figure 5, in which hand levers 42 are secured to the shaft portions 34 so that either of the shaft portions may be rocked to cause the lifting or lowering of the cultivating tools, the rocking movement being communicated through the arms 36 and links 37 to the supports for the cultivating tools. The contiguous ends of the shafts 34 are enclosed in a collar 43 having arcuate racks for the levers 42. The lever 44 is secured to the collar 43 for rocking the collar and both of the racks which are secured thereto. The position of the lever 44 is fixed by means of the usual pawl and rack, the rack 45 being secured to the cultivator frame. It is thus obvious that the actuation of either lever 42 will raise or lower the cultivator gang to which it is secured and that the actuation of the lever 44 will simultaneously raise or lower both cultivating gangs.

Pivotally secured to the truck beam 17 at 45 is a T-shaped lever having aligned arms 46 and an arm 47 extending rearwardly and at right angles to the arms 46. The arm 47 is provided in its rear portion with an arcuate slot 48 for receiving a pin 49 which is secured to the beam 17 for the purpose of guiding the movements of the T-shaped lever and for holding the lever in a fixed plane during its movements. The arms 46 are secured at their ends to links 50 which connect the arms 46 to the foot pedals 33. Pressure on a foot pedal thus rocks not only the steering lever 30 but the T-shaped lever as well. Pivotally connected at 51 to the T-shaped lever is another T-shaped lever having aligned arms 52 and an arm 53 positioned at right angles to the aligning arms. Adjacent the driver's seat is a hand operated lever 54 with the usual arcuate rack, this lever being connected at its lower end with the arm 53 by means of the link 55. The actuation of the hand lever 54 thus rocks the arms 52 about the pivot 51 while the actuation of either foot lever 33 will rock the arms 52 about the pivot 45. As shown in Figure 1, links 56 connect the free ends of the arms 52 with the members 39 to which the cultivator gangs are secured. The movement of the links 56 thus causes the members 39 with the cultivating gangs to move laterally, both in the same direction and through equal distances. The lateral shifting of the cultivator gangs may thus be accomplished in connection with the actuation of the steering mechanism by means of the foot levers 33 or independently of the steering mechanism by means of the hand lever 54.

Having thus described our invention in such full, clear, and exact terms that its construction and operation will be readily understood by others skilled in the art to which it pertains, what we claim as new and desire to secure by Letters Patent of the United States is:

1. A cultivator including a frame, a pair of steerable wheels secured thereto at the rear corners thereof, a tongue pivotally secured to the rear beam of said frame, said tongue being adapted to support a truck at its forward extremity, a yoke on said frame for guiding the pivotal movements of said tongue, means for vertically adjusting said tongue, a pair of gangs of cultivating tools secured to said frame, and means for simultaneously shifting said steerable wheels and said gangs in either direction, said means including a lever secured to said tongue and connections between said lever and said steerable wheels and said gangs.

2. A cultivator including a frame, a pair of steerable wheels secured thereto at the rear corners thereof, a tongue pivotally secured to the rear beam of said frame, said tongue being adapted to support a truck at its forward extremity, means for vertically adjusting said tongue, a pair of gangs of cultivating tools secured to said frame, foot levers secured to said frame and having connections whereby the actuation of either of said foot levers causes the shifting of both of said steerable wheels, a lever pivotally secured to said tongue and having connections to said foot lever, a second lever pivotally secured to the first said lever, connections from said second lever to said gangs, a manually operable lever on said frame, and a connection from said second lever to said manually operable lever.

3. A cultivator including a frame, steering wheels journalled to said frame, a truck beam pivotally secured to said frame at the rear portion thereof and projecting forwardly of the front portion thereof, a rearwardly projecting seat supporting beam piovtally secured to said frame at the front portion thereof, manually adjustable connections between said truck beam and said seat supporting beam, cultivating tools carried by said frame, a lever on said truck beam, connections between said lever and said cultivating tools, means under the control of the driver for actuating said lever and connections for laterally shifting said cultivating tools and for simultaneously steering said cultivator through said steering wheels, and manually operable means for actuating said lever and connections for laterally shifting said cultivating tools without steering said cultivator.

4. A cultivator including a rectangular frame, steering wheels journalled to said frame at the rear corners thereof, a truck beam pivotally secured to the rear member of said frame, means on the forward member of said frame for limiting the pivotal movement of said truck beam, a seat supporting beam pivotally connected to the forward member of said frame and projecting rearwardly therefrom, manually operable connections between said truck beam and said seat beam for vertically adjusting the forward portion of said frame, cultivating tools flexibly supported by said frame, a link connection between said truck beam and said cultivating tools for shifting said cultivating tools laterally, means under the control of the operator for actuating said link connection and for simultaneously steering said cultivator through said steering wheels, and manually operable means for actuating said lever and connections for laterally shifting said cultivating tools without steering said cultivator.

5. A cultivator including a rectangular frame, a pair of supporting and steering wheels journalled on said frame at the rear corners thereof, a truck beam pivotally connected to the rear transverse member of said frame, a yoke depending from the front transverse member of said frame for guiding and limiting the pivotal movement of said truck beam, a seat supporting beam pivotally connected to the front transverse member of said frame and projecting rearwardly over the rear transverse member of said frame, a gang of cultivating tools flexibly secured to said frame, means secured to said gang and to said truck beam for shifting said gang laterally, a hand lever secured to said seat supporting beam, said gang shifting means being operable by said hand lever, and foot operated means on said frame for simultaneously actuating said mechanism and moving said steering wheels about their steering axes.

6. A cultivator including a frame, a pair of steerable wheels journalled to said frame, a pair of gangs of cultivating tools carried by said frame, means on said frame for manually raising or lowering either or both of said gangs, foot levers and connections on said frame for swinging both of said steerable wheels in either direction, a T-shaped lever pivotally secured to said frame, connections between said T-shaped lever and said gangs, said connections including a second T-shaped lever pivotally secured to said first named T-shaped lever, foot operated levers connected to said first T-shaped levers and to said steerable wheels for simultaneously shifting said gangs and said steerable wheels in the same direction, and a hand lever on said frame and connected to the second of said T-shaped levers for shifting said gangs independently of the steering movements of said frame.

In testimony whereof we affix our signatures.

LEON W. CHASE.
JAMES C. BRAND.